United States Patent Office 2,843,817
Patented July 15, 1958

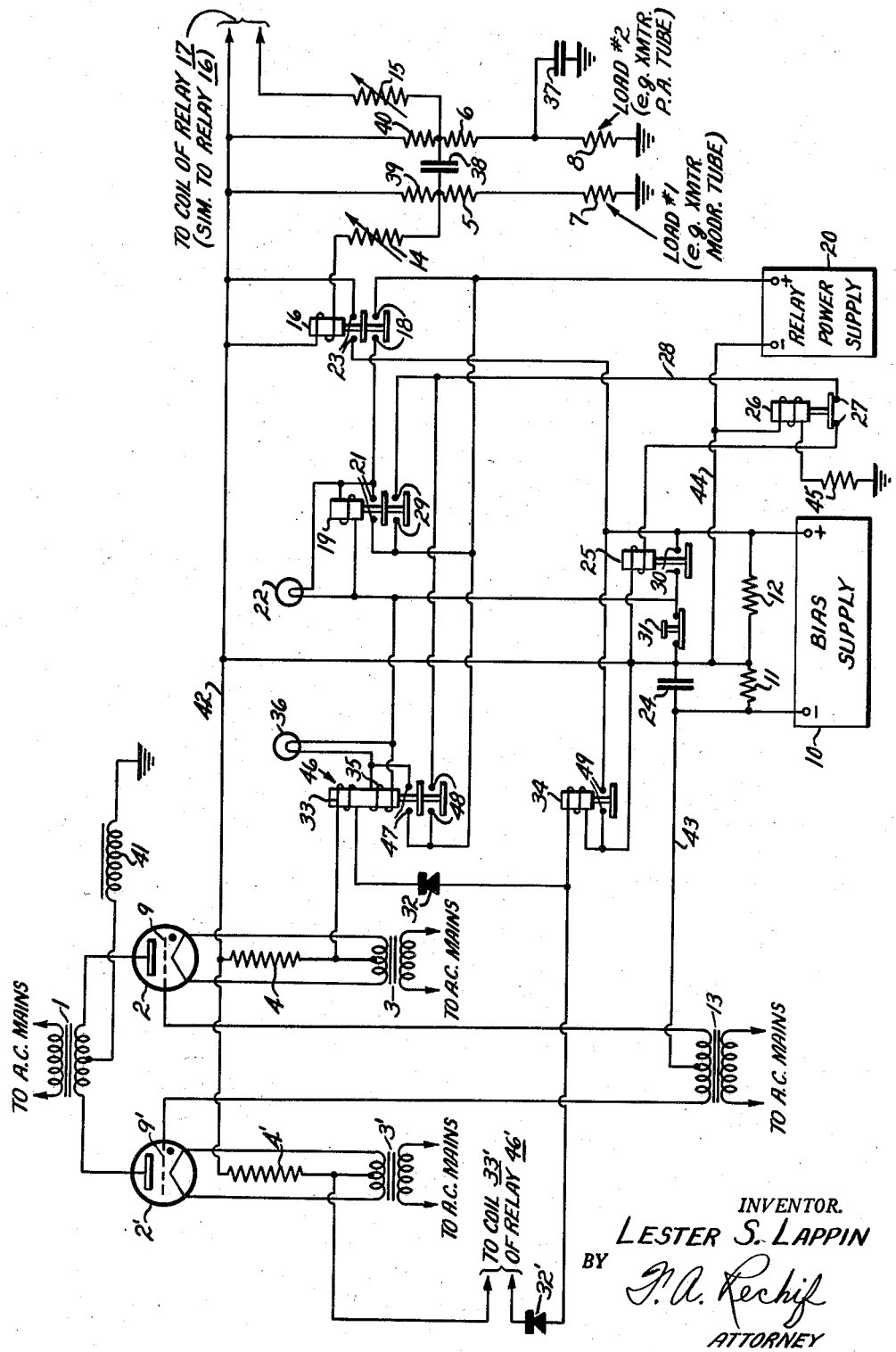

2,843,817

PROTECTIVE CIRCUIT

Lester S. Lappin, Merchantville, N. J., assignor to Radio Corporation of America, a corporation of Delaware Application June 24, 1955, Serial No. 517,733

11 Claims. (Cl. 321—13)

This invention relates to a protective circuit, and more particularly to a circuit for protecting the high voltage power supply and the modulator and power amplifier stages of a radio transmitter from the damaging effects which might otherwise occur as a result of overloads in the modulator or power amplifier stages, or as a result of arc backs in the rectifier tubes of the power supply.

In a high power rectifier using mercury vapor rectifier tubes and supplying a load in a radio transmitter, the currents which flow under fault conditions may be extremely high and the power dissipated under these conditions may be sufficient to cause considerable damage to either the rectifier or the load, unless the power is removed fast enough. Prior protective circuits ordinarily used overload relays, circuit breakers and contactors, all of which require 0.1 second or longer after the occurrence of the fault, before the circuit is interrupted. During this time interval fault currents as high as twenty-five times normal may flow.

An object of this invention is to devise a novel protective circuit for transmitters which is extremely fast acting, both on overload and on arc backs in the rectifiers of the power supply.

Another object is to devise a novel protective circuit for transmitters which acts to recycle after a fault, so that in the event a fault is cleared within a certain time, such as two seconds, the power is automatically restored.

A further object is to provide a protective circuit for transmitters, with means for minimizing the effect of alternating currents which flow in the transmitter tube load, on the overload protective circuit.

A still further object is to devise a novel fast-acting protective circuit for transmitters which is relatively simple and inexpensive.

The objects of this invention are accomplished, briefly, in the following manner: A relay is connected to be operated in response to an overload, the operation of this relay increasing the bias on the rectifier tubes of the power supply so that they do not conduct, thus immediately removing power from the load. This relay drops out as soon as the rectifier output drops to zero, to begin the recycling and to allow the bias on the rectifier tubes to be decreased to the point of conduction at the end of a time interval determined by the discharging of a capacitor. If the fault is cleared, normal operation is resumed, but if it persists the relay will again operate and the above-described sequence of operations will be repeated until a lockout relay operates at the end of a predetermined time interval to increase the bias on the rectifier tubes and to maintain it increased, so that the rectifier output remains at zero. Another relay is connected in combination with a rectifier in such a way that arc backs in the rectifier tube or tubes operate this other relay to increase the bias on the rectifier tubes and stop conduction therein, the recycling then being initiated by this other relay when it drops off, as soon as the rectifier output drops to zero. For arc backs, the lockout relay circuit then operates in the same way as previously described.

The foregoing and other objects of the invention will be better understood from the following description of an exemplification thereof, reference being had to the accompanying drawing, wherein the single figure is a circuit diagram illustrating the protective circuit of this invention.

Referring to the drawing, the primary winding of a plate transformer 1 is connected to the alternating current (A. C.) power supply mains, and opposite ends of the secondary winding of this transformer are connected to the respective plates of two grid-controlled gaseous rectifier tubes 2 and 2', which may for example be type 5563 thyratrons. The alternating current in the A. C. mains may be 60 cycles per second, for example. The rectifier circuit is illustrated as a single-phase full-wave circuit, but it is desired to be pointed out that the protective circuit of this invention can be used with any conventional rectifier circuit. The midpoint of the secondary winding of transformer 1 is connected through a choke 41 to ground, to constitute the negative terminal of the rectifier power supply. The primary windings of transformers 3 and 3' supplying heating energy to the filaments of tubes 2 and 2' are both connected to the A. C. power supply mains, the secondary winding of transformer 3 energizing the filament in tube 2 and the secondary winding of transformer 3' energizing the filament in tube 2'. A resistor 4 is connected from the midpoint of the secondary winding of transformer 3 to the rectifier output lead 42, and a resistor 4' is connected from the secondary winding of transformer 3' to the rectifier output lead 42. Lead 42 thus constitutes the positive output lead of the rectifier power supply, and the output current of the rectifier flows in parallel through resistors 4 and 4' to lead 42.

From lead 42, the rectifier output current flows through a resistor 5 to a first load represented schematically by a resistor 7. This first load may, for example, be the modulator tube or tubes of a radio transmitter. From lead 42, the rectifier output current also flows through a resistor 6 to a second load represented schematically by a resistor 8. This second load may for example be the power amplifier tube of the radio transmitter.

Direct current bias is supplied to the control grids 9 and 9' of the respective rectifier tubes 2 and 2' by the bias supply 10, which is any suitable unidirectional power supply having positive and negative terminals as illustrated. A voltage divider consisting of two resistors 11 and 12 is connected from the negative terminal to the positive terminal of bias supply 10, and the common junction of these two resistors is connected to lead 42 and thus to the filaments of tubes 2 and 2'. To complete the biasing circuit, a lead 43 connects the negative terminal of bias supply 10 to the midpoint of the secondary winding of a pulse transformer 13 and the opposite ends of this secondary winding are connected to the respective grids 9 and 9'. Under normal conditions, then, the bias supplied to grids 9 and 9' is that developed across resistor 11. This direct current bias is of sufficient magnitude to prevent conduction in tubes 2 and 2' in the absence of an alternating current voltage on the control grids 9 and 9'.

Tubes 2 and 2' are caused to conduct at predetermined times by superimposing a narrow pulse on the D. C. bias. This pulse is provided by means of a pulse transformer 13 the primary winding of which is connected to the A. C. mains, and such pulse is of a magnitude sufficient to override the cutoff D. C. bias on tubes 2 and 2'. The pulse results from the unsaturated condition of pulse transformer 13 occurring when the A. C. mains current is going through zero; the core of this transformer is saturated at all other times during the A. C. cycle.

From output lead 42, a connection extends through the operating coil of a relay 16 and through an adjustable resistor 14 to a tap on resistor 5, so that a portion of the current drawn by load 7 flows through the coil of relay 16. In normal operation, a resistor 14 is adjusted so that relay 16 will operate in response to a current flowing through load 7 which is slightly above the normal current for this load, but will not operate in response to the normal load current. When an overload occurs in load 7, an excess current flows through the coil of relay 16, causing it to operate. Relay 16 has two pairs of normally-open contacts 18 and 23, which are closed when this relay operates. When contacts 18 close, a circuit for energization of an indicator relay 19 is completed as follows: Positive terminal of a relay power supply 20 (which may be any suitable low-voltage unidirectional source), now-closed contacts 18, the coil of relay 19, normally-closed manually-operated reset switch 31 and lead 44 to the negative terminal of relay power supply 20. Power supply 20 also supplies operating power for lockout relay 25, to be later referred to in detail, and holding power for indicating relays 46 and 46', also to be later referred to in detail.

Relay 19 has two pairs of normally-open contacts 21 and 29, which are closed when this relay operates. When holding contacts 21 close, a holding circuit for relay 19 is completed as follows, causing this relay to remain operated: Positive terminal of power supply 20, now-closed contacts 21, coil of relay 19, normally-closed reset switch 31 and lead 44 to the negative terminal of power supply 20. An indicating lamp 22 is connected across the coil of indicator relay 19. This lamp is lighted when relay 19 is energized or operated, due to the voltage drop across this relay coil. Thus, indicating lamp 22 lights to indicate the presence of an overload in load 7 (load No. 1).

Relay 16 is extremely fast-acting and it operates substantially instantaneously upon the occurrence of an overload in load 7. When relay 16 operates, its contacts 23 also close to short-circuit resistor 12, since one contact of this contact pair 23 is connected to lead 42 and the other contact of pair 23 is connected to the positive terminal of bias supply 10. The short-circuiting of resistor 12 causes the full voltage of bias supply 10 to appear across resistor 11 and a capacitor 24 which is connected in parallel therewith. It will be remembered that the bias applied to grids 9 and 9' is that developed across resistor 11. This bias is increased when resistor 12 is short-circuited, so that the bias then applied to control grids 9 and 9' is increased to the full voltage of bias supply 10. The magnitude of this voltage is such that the pulses generated by pulse transformer 13 are no longer sufficient to cause conduction in the tubes 2 and 2', so that the rectifier output (at lead 42) is reduced to zero. Since contacts 23 are closed substantially instantaneously upon occurrence of an overload in load 7, and since the cutting-off of the rectifiers 2 and 2' is then effected with no delay, solely electronically by the application of increased grid bias, it may be seen that the power is removed from the load almost instantaneously upon the occurrence of an overload in load 7. In fact, the speed of operation of the protective circuit has been found by measurement to be consistently less than 0.5 millisecond, on short-circuit.

Power can be supplied to any number of loads such as 7 and 8, each with individual protection and indication. Thus, load 8 may have associated with it the calibration resistor 15, an overload relay 17 (not shown) similar to relay 16 and arranged in a manner similar to relay 16, and another indicator relay similar to relay 19, together with an indicating lamp similar to lamp 22. This other indicator relay is arranged in a manner similar to relay 19. In the figure, the indicator relay and indicating lamp associated with overload relay 17 are not shown. The particular indicating lamp such as 22 which is lit indicates the location of the fault, or where the overload condition occurred.

When the rectifier output is reduced to zero by the cutting-off of rectifiers 2 and 2, there is no longer any energizing voltage for relay 16, so that this relay becomes deenergized or drops out, opening its contacts 23 and removing the short-circuit from across resistor 12. Relay 16 is not energized from relay supply 20 because, for energization, one end of the coil of this relay must be grounded, and neither terminal of power supply 20 goes to ground; as far as relay 16 is concerned, both terminals of supply 20 are essentially at the same potential. This removal of the short-circuit from across 12 decreases the effective applied voltage on capacitor 24, and capacitor 24 then starts to discharge at a rate determined by the time constant of capacitor 24 and resistor 11. After a period of time determined by this time constant, the bias voltage on grids 9 and 9' (that is, the voltage across resistor 11 and capacitor 24) drops to a value low enough to allow conduction in tubes 2 and 2'. This provides automatic recycling. If the fault has then cleared (overload conditions no longer existing in the load) normal operation is resumed. However, if the fault persists relay 16 will again be operated as before, and the foregoing sequence of operations is repeated until a lockout relay 25 operates. Relay 25 is a time delay relay the contacts of which close approximately two seconds after its coil is energized, so that this relay will be operated about two seconds after the start of the overload, if the fault still persists.

One end of the coil of an anti-lockout relay 26 is connected to the positive rectifier output lead 42 by way of lead 44 and the other end of this coil is connected through a dropping resistor 45 to ground. Whenever voltage is present between lead 42 and ground, that is, whenever the rectifier output voltage is present, relay 26 is energized. Relay 26 is not energized from relay supply 20 because, for energization, one end of the coil of this relay must be grounded, and neither terminal of power supply 20 goes to ground; as far as relay 26 is concerned, both terminals of supply 20 are essentially at the same potential. Relay 26 is a slow-acting relay, that is, it is a slow-operate, slow-release relay, and it has a pair of normally-closed contacts 27 which are opened when relay 26 operates. During normal operation of the rectifier power supply, relay 26 is continuously energized and its contacts 27 remain open. One end of the coil of relay 25 is connected to lead 44 and the negative terminal of relay supply 20, while contacts 27 are connected between the opposite end of such coil and lead 28. Thus, the energization circuit for relay 25 from lead 28 may be completed only through contacts 27, and when these contacts are open relay 25 is disabled.

In the event of operation of any of the overload indicator relays, such as relay 19 for example, relay power from the positive terminal of power supply 20 is applied to lead 28 through the contacts 29, which are normally open but which are closed when relay 19 operates. This sets up a possible circuit for energization of relay 25 through contacts 27, if the latter are closed. Relay 25 is a time delay relay and its contacts close approximately two seconds after its coil is energized. If the fault is cleared before lockout relay 25 can operate, the rectifiers 2 and 2' again conduct and normal operation is resumed, due to the recycling action previously described. If normal operation is automatically resumed at any time within two seconds of the start of the overload, relay 26 is again energized (even though it had previously become deenergized as a result of the absence of voltage on output lead 42), opening contacts 27 and disabling relay 25, thus preventing operation of the lockout relay 25, When normal operation is resumed, voltage is present on output lead 42, resulting in the energization of relay 26. Even though normal operation is resumed automatically, the indicating lamp 22 remains lit, signifying that a fault has occurred. In this case, manual opening of reset switch 31 deenergizes relay 19 and extinguishes lamp 22.

During the recycling of the circuit, output voltage is present on lead 42 only during a very small portion of the total time (for example, it is present less than about one-half millisecond, then absent for about one-quarter second), so that relay 26 drops out or is deenergized, closing contacts 27. Relay 26 may thus drop out during the recycling, even though it may eventually be energized and pull up (and stay up) due to the prolonged presence of output voltage on lead 42, prior to the operation of lockout relay 25.

If the fault does not clear, relay 26 drops out (is deenergized) and remains out as a result of the prolonged absence of output voltage on lead 42. Deenergization of relay 26 closes its contacts 27 and applies relay power to the coil of relay 25 through a circuit as follows: Positive terminal of relay supply 20, now-closed contacts 29 of relay 19, lead 28, closed contacts 27 of relay 26, coil of relay 25, lead 44 to negative terminal of power supply 20. After a predetermined period of time (the time delay of relay 25, approximately two seconds) relay 25 operates, closing its normally-open contacts 30. This short-circuits resistor 12 through the normally-closed reset switch 31, causing the voltage across resistor 11 (applied to grids 9 and 9') to go to and remain at the full voltage of bias supply 10, which is cutoff voltage for the rectifier tubes. Then, the rectifier tubes 2 and 2' cannot conduct and the output voltage remains off lead 42, causing relay 16 to remain deenergized and deenergizing both of the loads 7 and 8.

Operation can under these conditions be resumed only by manually operating the reset switch 31 to open the same. Opening of switch 31 breaks all energizing circuits for relay 19 and this relay releases or falls out, opening its contacts 29 and removing relay power from lead 28. This in turn breaks the energizing circuit for relay 25 and the latter drops out or releases, opening its contacts 30. Opening of switch 31 also removes the short-circuit from resistor 12, decreasing the control grid bias on tubes 2 and 2' and causing these tubes to again conduct, providing output voltage on lead 42. This in turn causes energization of relay 26, opening its contacts 27 to break the circuit to the coil of relay 25, so that the latter would be deenergized in this way even though contacts 29 of relay 19 were still closed.

The releasing, falling out, dropping off or deenergization of relay 19 extinguishes the indicator lamp 22.

The protective circuit of this invention also operates to protect against arc backs in the rectifier tubes. A relay 46 has an operating coil 33 and a holding coil 35, and the operating coil 33 is connected between the midpoint of the secondary winding of transformer 3 and one side of a rectifier 32. The other side of rectifier 32 is connected through the coil of a relay 34 to output lead 42. Thus, in parallel with resistor 4 is the series combination of coil 33, rectifier 32 and the coil of relay 34. During normal operation, the output current of the rectifier flows through resistor 4 in such a direction that rectifier 32 is nonconducting, but during an arc back the current through the tube 2 (assumed faulty) and resistor 4 reverses.

Similarly, a relay 46' (not shown) has an operating coil 33' and a holding coil, and the operating coil 33' is connected between the midpoint of the secondary winding of transformer 3' and one side of a rectifier 32'. The other side of rectifier 32' is connected through the coil of the relay 34 to output lead 42. Thus, in parallel with resistor 4' is the series combination of coil 33', rectifier 32' and the coil of relay 34. During normal operation, the output current of the rectifier flows through resistor 4' in such a direction that rectifier 32' is nonconducting, but during an arc back the current through the tube 2' (assumed faulty) and resistor 4' reverses. Relay 46' is similar to relay 46, is provided with contacts which are connected in the same way as those of relay 46, and includes a holding coil, an indicating lamp, etc., just like relay 46.

Assume that an arc back occurs in tube 2. With the reversal of current, rectifier 32 becomes conducting, and current flows through the coil 33 of relay 46 and through the coil of relay 34, to operate relays 46 and 34, this current resulting from the voltage drop across resistor 4. Relay 46 has two pairs 47 and 48 of normally-open contacts, which are closed when this relay operates. Relay 46 then holds itself closed by virtue of holding coil 35, through a circuit as follows: Positive terminal of relay supply 20, now-closed contacts 47, coil 35, normally-closed reset switch 31 and lead 44 to the negative terminal of power supply 20. An indicating lamp 36 is connected across the coil 35, this lamp being lighted due to the voltage drop across such coil when coil 35 is energized. Indicating lamp 36 lights to indicate the presence of an arc back.

Relay 34 has one pair 49 of normally-open contacts which are connected in parallel with contacts 23, so that when contacts 49 are closed by the energization of relay 34 in response to an arc back, resistor 12 is short-circuited. Just as previously described in connection with contacts 23 operated by relay 16, the rectifier tubes 2 and 2' are then biased beyond cutoff and conduction in these tubes is stopped. Just as previously described in connection with relay 16, relay 34 drops out when the rectifier output is reduced to zero, removing the short-circuit from across resistor 12 and beginning the operation of the automatic recycling, just as described above in connection with relay 16 and capacitor 24, etc.

Also, when relay 46 is closed, relay power from the positive terminal of power supply 20 is applied to lead 28 through the contacts 48, which are normally open but are closed when relay 46 operates. Just as previously described in connection with contacts 29 operated by relay 19, lockout relay 25 is then set up for operation in the same manner as described above, and relays 25 and 26 operate in exactly the same manner as previously described. In other words, from the operation of relays 46 and 34 on, both the recycling and lockout circuits operate in exactly the same manner as previously described. In this connection, it will be noted that the contacts 48 of relay 46 are connected directly in parallel with the contacts 29 of relay 19.

In a radio transmitter using high level modulation, load 7 may be the modulator tube or tubes and load 8 may be the power amplifier tube, as previously stated. In both of these load circuits, it is normal for audio frequency currents to flow. In each case, these audio frequency currents must find a path to ground through the rectifier filter capacitor 37, which is connected to ground from the common junction of resistor 6 and load 8. These currents must find a path to ground because the speed of the overload protective circuit is such that it could respond to the lower audio frequency currents if such currents were permitted to flow through the overload relays 16 and 17. It is not practical to bypass both loads 7 and 8 to ground since the impedances represented by resistors 5 and 6 are quite low and the bypass capacitors would have to be extremely large for effective bypassing.

According to this invention, this problem is solved by first connecting the filter capacitor 37 across the power amplifier 8 such that its A. C. component is bypassed to ground directly. Then, a capacitor 38 is connected between the taps on resistors 5 and 6. If the reactance of capacitor 38 is small compared to the resistances 39 and 40 (which are the parts of resistors 5 and 6 respectively above the taps), the audio frequency currents flowing in resistances 39 and 40 and relays 16 and 17 will be negligibly small.

In a protective system built according to this invention and successfully tested, the output voltage at lead 42 was 5,000 volts and the voltage between the terminals of bias supply 10 was 400 volts. The following values are those of certain of the resistors and capacitors used, and these are given by way of example.

Resistors 4 and 4'____ 2.5 ohms each.
Resistors 5 and 6____ 15 ohms each, tapped at 11 ohms.
Resistor 11_____ 40,000 ohms.
Resistor 12_____ 82,000 ohms.
Resistors 14 and 15_ 500 ohms each (adjustable).
Capacitor 24_____ 10 mfd.
Capacitor 37_____ 16 mfd.
Capacitor 38_____ 50 mfd.

With the values of components indicated, the recycling time, determined by resistor 11 and capacitor 24, is approximately ¼ second.

What is claimed is:

1. In a power supply circuit, a grid-controlled gaseous rectifier for supplying unidirectional power to a load, means for supplying a negative operating bias to the grid of said rectifier, means responsive to an abnormal condition in said circuit for increasing the bias supplied to said grid to a value sufficient to cut off said rectifier, said last-mentioned means acting in response to the cutting off of said rectifier to nullify said increase of bias, and time delay means for delaying the reapplication of said operating bias for a predetermined time interval after said nullification has occurred.

2. In a power supply circuit, a grid-controlled gaseous rectifier for supplying unidirectional power to a load, means for supplying a negative operating bias to the grid of said rectifier, relay means responsive to an abnormal condition in said circuit for increasing the bias supplied to said grid to a value sufficient to cut off said rectifier, and separate means responsive to the continued existence of said abnormal condition, at the end of a predetermined interval following the onset thereof, for increasing the bias supplied to said grid to a cutoff value.

3. In a power supply circuit, a grid-controlled gaseous rectifier for supplying unidirectional power to a load, means for supplying a negative operating bias to the grid of said rectifier, means responsive to an abnormal condition in said circuit for increasing the bias supplied to said grid to a value sufficient to cut off said rectifier, said last-mentioned means acting in response to the cutting off of said rectifier to nullify said increase of bias, time delay means for delaying the reapplication of said operating bias for a predetermined time interval after said nullification has occurred, and separate means responsive to the continued existence of said abnormal condition, at the end of a predetermined interval following the onset thereof, for cutting off said rectifier.

4. In a power supply circuit, a grid-controlled gaseous rectifier for supplying unidirectional power to a load, means for supplying a negative operating bias to the grid of said rectifier, relay means responsive to an abnormal condition in said circuit for increasing the bias supplied to said grid to a value sufficient to cut off said rectifier, said relay means acting in response to the cutting off of said rectifier to nullify said increase of bias, time delay means for delaying the reapplication of said operating bias for a predetermined time interval after said nullification has occurred, and separate means responsive to the continued existence of said abnormal condition, at the end of a predetermined interval following the onset thereof, for increasing the bias supplied to said grid to a cutoff value.

5. In a power supply circuit, a grid-controlled gaseous rectifier for supplying unidirectional power to a load, means for supplying a negative operating bias to the grid of said rectifier, means responsive to an excessive current drawn by said load for increasing the bias supplied to said grid to a value sufficient to cut off said rectifier, said last-mentioned means acting in response to the cutting off of said rectifier to nullify said increase of bias, and time delay means for delaying the reapplication of said operating bias for a predetermined time interval after said nullification has occurred.

6. In a power supply circuit, a grid-controlled gaseous rectifier for supplying unidirectional power to a load, means for supplying a negative operating bias to the grid of said rectifier, means responsive to an arc back in said rectifier for increasing the bias supplied to said grid to a value sufficient to cut off said rectifier, said last-mentioned means acting in response to the cutting off of said rectifier to nullify said increase of bias, and time delay means for delaying the reapplication of said operating bias for a predetermined time interval after said nullification has occurred.

7. In a power supply circuit, a grid-controlled gaseous rectifier for supplying unidirectional power to a load, means for supplying a negative operating bias to the grid of said rectifier, means responsive to an excessive current drawn by said load for increasing the bias supplied to said grid to a value sufficient to cut off said rectifier, said last-mentioned means acting in response to the cutting off of said rectifier to nullify said increase of bias, means responsive to an arc back in said rectifier for increasing the bias supplied to said grid to a value sufficient to cut off said rectifier, said last-mentioned means acting in response to the last-mentioned cutting off of said rectifier to nullify said last-mentioned increase of bias, and common time delay means for delaying the reapplication of said operating bias for a predetermined time interval after either of said nullifications has occurred.

8. In a power supply circuit, a grid-controlled gaseous rectifier for supplying unidirectional power to a load, means for supplying a negative operating bias to the grid of said rectifier, means responsive to an excessive current drawn by said load for increasing the bias supplied to said grid to a value sufficient to cut off said rectifier, means responsive to an arc back in said rectifier for increasing the bias supplied to said grid to a value sufficient to cut off said rectifier, and common means responsive to the continued existence of said excessive current condition or of said arc back condition, at the end of a predetermined interval following the onset of either of said conditions, for cutting off said rectifier.

9. In a power supply circuit, a grid-controlled gaseous rectifier for supplying unidirectional power to a load, means for supplying a negative operating bias to the grid of said rectifier, means responsive to an excessive current drawn by said load for increasing the bias supplied to said grid to a value sufficient to cut off said rectifier, said last-mentioned means acting in response to the cutting off of said rectifier to nullify said increase of bias, time delay means for delaying the application of said operating bias for a predetermined time interval after said nullification has occurred, and means responsive to the continued existence of said excessive current condition, at the end of a predetermined interval following the onset thereof, for cutting off said rectifier.

10. In a power supply circuit, a grid-controlled gaseous rectifier for supplying unidirectional power to a load, means for supplying a negative operating bias to the grid of said rectifier, means responsive to an arc back in said rectifier for increasing the bias supplied to said grid to a value sufficient to cut off said rectifier, said last-named means acting in response to the cutting off of said rectifier to nullify said increase of bias, time delay means for delaying the reapplication of said operating bias for a predetermined time interval after said nullification has occurred, and means responsive to the continued existence of said arc back condition, at the end of a predetermined interval following the onset thereof, for cutting off said rectifier.

11. In a power supply circuit, a grid-controlled gaseous rectifier for supplying unidirectional power to a load, means for supplying a negative operating bias to the grid of said rectifier, means responsive to an excessive current drawn by said load for increasing the bias supplied to said grid to a value sufficient to cut off said rectifier, said last-mentioned means acting in response to the cutting off of said rectifier to nullify said increase of bias, means responsive to an arc back in said rectifier for increasing the bias supplied to said grid to a value sufficient to cut off said rectifier, said last-mentioned means acting in response to the last-mentioned cutting off of said rectifier to nullify said last-mentioned increase of bias, common time delay means for delaying the reapplication of said operating bias for a predetermined time interval after either of said nullifications has occurred, and common means responsive to the continued existence of said excessive current condition or of said arc back condition, at the end of a predetermined interval following the onset of either of said conditions, for cutting off said rectifier.

References Cited in the file of this patent
UNITED STATES PATENTS

| | | |
|---|---|---|
| 2,015,041 | Prince | Sept. 17, 1935 |
| 2,169,202 | Winograd | Aug. 8, 1939 |
| 2,179,308 | Taliaferro | Nov. 7, 1939 |
| 2,257,449 | Bany | Sept. 30, 1941 |